United States Patent
Vetesnik

(10) Patent No.: US 9,827,452 B2
(45) Date of Patent: Nov. 28, 2017

(54) FALL PROTECTION APPARATUS WITH A MAST AND A BOOM

(71) Applicant: Tuffbuilt Products Inc., Winnipeg (CA)

(72) Inventor: Jan Vetesnik, Winnipeg (CA)

(73) Assignee: Tuffbuilt Productas Inc., Winnipeg, MB (CA)

( * ) Notice: Subject to any disclaimer, the term of this patent is extended or adjusted under 35 U.S.C. 154(b) by 0 days.

(21) Appl. No.: 15/184,543

(22) Filed: Jun. 16, 2016

(65) Prior Publication Data
US 2016/0375281 A1 Dec. 29, 2016

Related U.S. Application Data

(63) Continuation-in-part of application No. 14/847,435, filed on Sep. 8, 2015.
(60) Provisional application No. 62/183,964, filed on Jun. 24, 2015.

(51) Int. Cl.
*E04G 21/32* (2006.01)
*A62B 35/00* (2006.01)

(52) U.S. Cl.
CPC ........ *A62B 35/0068* (2013.01); *E04G 21/329* (2013.01); *A62B 35/0006* (2013.01); *E04G 21/3204* (2013.01)

(58) Field of Classification Search
CPC .............. E04G 21/329; E04G 21/3204; E04G 21/3261; F16M 11/28; F16M 11/18; F16M 11/42; F16M 11/2021; A62B 35/0068; A62B 35/0006; E04H 12/182; E04H 12/34
See application file for complete search history.

(56) References Cited

U.S. PATENT DOCUMENTS

| | | | |
|---|---|---|---|
| 160,290 A | 3/1875 | Trenchard |
| 294,860 A | 3/1884 | Dye |
| 401,623 A | 4/1889 | Albert |
| 445,720 A | 2/1891 | Smitter et al. |
| 459,613 A | 9/1891 | Newman |
| 533,597 A | 2/1895 | Hughes |
| 815,594 A | 3/1906 | Kovacevic |
| 1,644,613 A | 10/1927 | Royer |

(Continued)

FOREIGN PATENT DOCUMENTS

| | | |
|---|---|---|
| CA | 2765986 | 7/2012 |
| CN | 2868971 | 2/2007 |

(Continued)

*Primary Examiner* — Babajide Demuren
(74) *Attorney, Agent, or Firm* — Adrian D. Battison; Ade & Company Inc.

(57) ABSTRACT

A fall protection apparatus includes a heavy support base with a pivotal mast having a top member for rotation around the axis of the mast carrying a series of booms pivotal about respective vertical axes, each having an end coupling member for receiving a fall restraint harness. Each boom is formed by a tube which fractures on a fall and an elongate stainless steel strap inside the tube which bends without fracturing. The mast includes a series of telescopic rectangular mast sections with a winch driven cable and pulley arrangement for extending the first section which acts to pull the second inner section to the extended position as the first inner section moves out of the outer section. Each section includes first and second pulleys mounted at the same face of the section with the cable located between the face of the section and the face of the next section.

26 Claims, 9 Drawing Sheets

(56) References Cited

U.S. PATENT DOCUMENTS

| | | |
|---|---|---|
| 2,571,858 A | 10/1951 | Garland |
| 2,671,638 A | 3/1954 | Allen |
| 2,952,340 A | 9/1960 | Schiff |
| 3,047,107 A | 7/1962 | Parmenter |
| 3,213,574 A | 10/1965 | Melbye |
| 3,248,831 A | 5/1966 | Jones |
| 3,328,921 A | 7/1967 | Keslin |
| 3,494,593 A | 2/1970 | Blagg |
| 3,521,341 A | 7/1970 | Hornlein |
| 3,638,806 A | 2/1972 | Hippach |
| 3,694,829 A | 10/1972 | Bakker |
| 4,580,377 A | 4/1986 | Sundin |
| 4,600,348 A | 7/1986 | Pettit |
| 4,785,309 A | 11/1988 | Gremillion |
| 4,932,176 A | 6/1990 | Roberts |
| 5,101,215 A | 3/1992 | Creaser, Jr. |
| 5,163,650 A | 11/1992 | Adams |
| 5,557,892 A | 9/1996 | Lavin |
| 5,615,855 A | 4/1997 | Marue |
| 6,041,558 A | 3/2000 | Sylvestre |
| 6,202,868 B1 | 3/2001 | Murray |
| 6,401,863 B1 | 6/2002 | Kirkland |
| 6,685,146 B1 | 2/2004 | Sanchez, Jr. |
| 6,978,974 B1 | 12/2005 | Marasco |
| 7,231,741 B2 | 6/2007 | Norwood |
| 7,537,085 B2 | 5/2009 | Vetesnik |
| 7,624,967 B1 | 12/2009 | Doebler |
| 8,025,125 B2 | 9/2011 | Vetesnik |
| 8,191,322 B2 | 6/2012 | Liestenfeltz |
| 8,365,471 B2 | 2/2013 | Diniz |
| 2007/0028532 A1 | 2/2007 | Douglas |
| 2009/0110527 A1 | 4/2009 | Kardohely |
| 2010/0126801 A1 | 5/2010 | Begin |
| 2010/0251634 A1 | 10/2010 | Diniz |
| 2011/0016628 A1 | 1/2011 | Masterson, Jr. |
| 2012/0151852 A1 | 6/2012 | Thoren |
| 2012/0151853 A1 | 6/2012 | Thoren |
| 2012/0319064 A1 | 12/2012 | Selkowitz |
| 2014/0008511 A1 | 1/2014 | Xammar Bove |
| 2014/0318040 A1 | 10/2014 | Edwards |
| 2015/0023017 A1 | 1/2015 | Smith |
| 2015/0360063 A1 | 12/2015 | Meyer |
| 2015/0361686 A1 | 12/2015 | Vetesnik |

FOREIGN PATENT DOCUMENTS

| | | |
|---|---|---|
| DE | 1906483 | 8/1970 |
| DE | 202010011441 | 11/2010 |
| GB | 160027 | 3/1921 |
| GB | 2497921 | 7/2013 |
| NL | 1003089 | 11/1987 |
| WO | WO8702257 | 4/1987 |

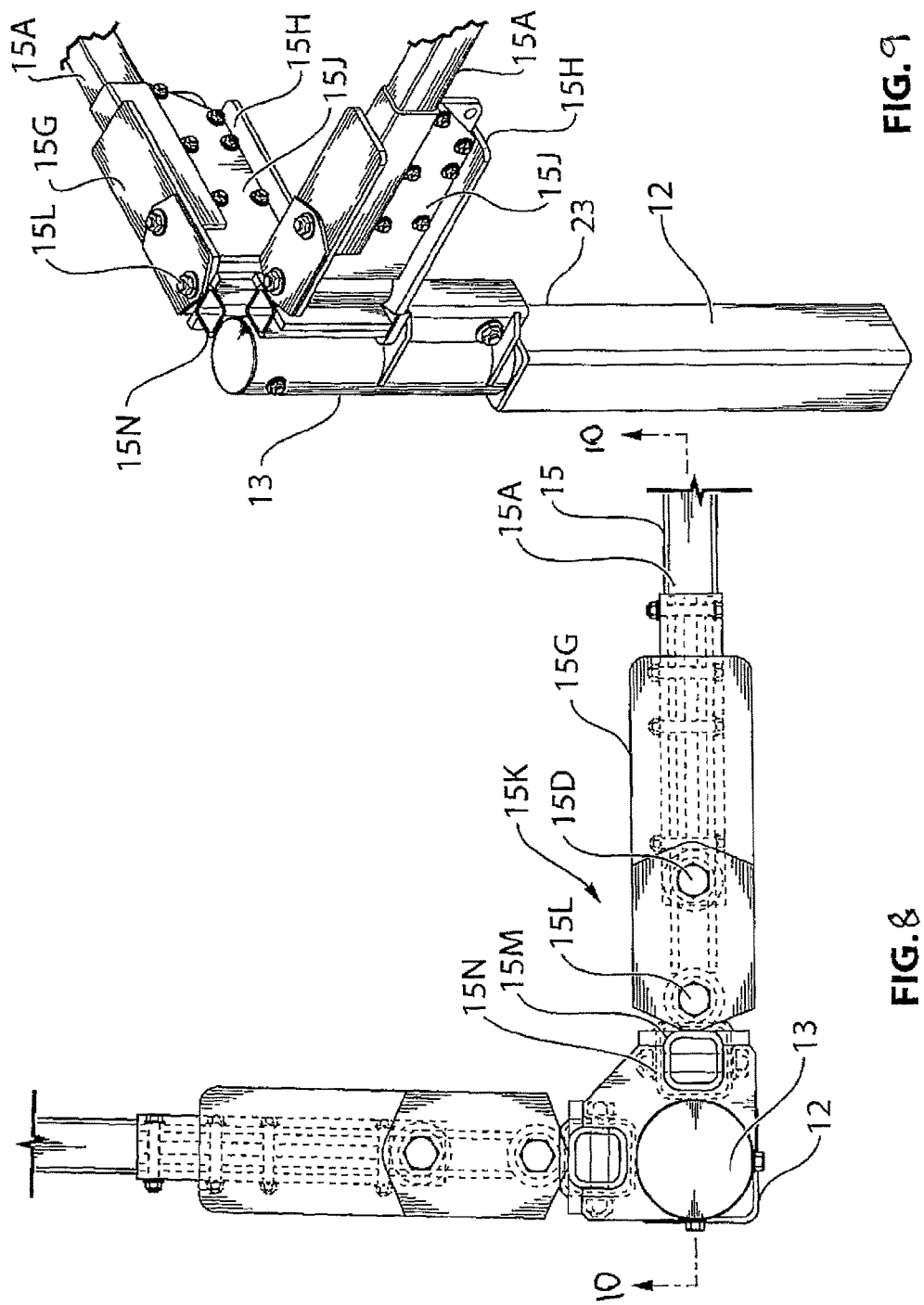

FALL PROTECTION APPARATUS WITH A MAST AND A BOOM

This application is a continuation in part of application Ser. No. 14/847,435 filed Sep. 8, 2015 and claims priority under 35 USC 119 (e) from Provisional application 62/183,964 filed Jun. 24, 2015.

This invention relates to a fall protection apparatus with a telescopic mast where the mast is mounted on a support base and carries a boom at the upper end onto which a fall restraint harness can be mounted.

BACKGROUND OF THE INVENTION

Upstanding or vertical masts are commonly used to provide an upper end of the mast supported from the ground to which items may be attached which apply a horizontal load to the mast tending to topple the mast to one side.

Where a permanent mounting is required, the mast can be inserted into a sleeve which can be connected to the structure of a building or the like by braces or by burying the sleeve in a concrete floor or other structural component.

Portable bases can also be provided which allow the base and the mast carried thereby to be moved to different locations. However these are typically metal in construction with various arms and braces so that the base is complex, massive and difficult to move.

One particular purpose for such masts is that of providing a davit defining a raised location for connection to a cable of a safety harness so that the mast can be located adjacent a place of work of a worker for attachment of the cable so that a fall of the worker from an elevated position will allow the safety harness to take up the fall before the worker reaches the ground. Of course, in order to achieve this, the mast must be closely adjacent the place of work to prevent the worker from swinging toward the mast as he falls. For this purpose preferably the base is portable, that is it is not attached to the building or local structure so that it can be lifted and moved.

An arrangement for supporting a fall restraint cable is shown in US Published Application 2012/0193165 published Aug. 2, 2012 by the present Applicant. This shows a fall restraint system includes a cable for attachment to a fall restraint harness assembly of a worker. The cable can be attached to a boom arm cantilevered on a mast carried from the ground or can be stretched between two points on opposed walls. A shock absorber is provided for absorbing at least part of the shock forces so as to reduce the loading applied to the support system. This comprises an elongate member with a movable member or sleeve mounted on it for longitudinal movement. The movement is resisted by a friction brake or a compressible material contained within a tube so that the sleeve moves along the tube in response to loads exceeding the normal load to reduce the loading on the cable while compressing the material in the tube. The present arrangement is particularly designed for use with the arrangement described in this application but can be used to support masts for other purposes.

SUMMARY OF THE INVENTION

According to a one aspect of the invention there is provided a fall protection system comprising:
  a support base;
  a mast mounted on the base so as to stand upwardly;
  a top support member mounted at a top of the mast;
  at least one boom attached to the support member and extending outwardly to one side of the mast;
  and a coupling member attached to the boom at the end of the boom for receiving a fall restraint harness of a worker so that load from a fall is applied to the coupling member;
  the boom comprising:
  a tube attached to the support member at an inner end of the tube and attached to the coupling member at an outer end of the tube;
  and an elongate member located inside the tube and attached to the support member at an inner end of the elongate member and attached to the coupling member at an outer end of the elongate member;
  the elongate member being arranged so that it bends without fracturing by application of said load applied by a fall to the coupling member;
  wherein the tube is of rectangular cross-section with a top wall, two side walls and a bottom wall;
  wherein the side walls include at least one weakening perforation therein arranged adjacent an outer end of the tube so that said bending of the elongate member commences and propagates a tearing action of the bottom wall from the side walls.

In order to best cope right with the bottom wall of the tube, preferably the elongate member located in the tube at or adjacent the bottom wall. In this arrangement preferably the elongate member is a strap and has a width substantially equal to a transverse interior width of the tube. In this way the elongate member in the fall of the strap lies flat against the bottom wall to effect a tearing action along the tube from the outer end as the strap bends.

Preferably the perforation is in the form of a single perforation defining a slot in the side wall extending along the side wall at a line of propagation of said tearing action and preferably the side walls each include a slot to propagate the tearing action.

It is of course necessary that the tearing action occurs only at a predetermined load sufficient to require that a fall has taken place rather than a user merely pulling on the cable. For this reason the perforation or slot in the side walls is spaced from the end of the tube to leave an intact portion of the side wall at the end so that the tearing action commences only at a predetermined load when the intact portion is broken.

An additional advantage in providing the above tearing action is that it provides an immediately visible indication of the occurrence of a fall thus preventing a user from continuing to use the device. Of course, in any situation, the occurrence of a fall will affect the structure even though such changes might not be typically visible. In this case, therefore, the action of the tearing of the tube necessarily provides an immediate visual indication that a fall has taken place requiring replacement of the structure.

According to another aspect of the invention there is provided a fall protection system comprising:
  a telescopic mast comprising:
  a plurality of tubular mast sections including an outer section, a first inner section slidable longitudinally within the outer section and a second inner section slidable longitudinally within the first inner section;
  each of the sections having a rectangular cross-section so that each has first, second, third and fourth faces parallel to and immediately adjacent respective first, second, third and fourth faces of each of the other sections;
  the sections being slidable from a retracted position where the first and second inner sections are at least partly within the outer section to an extended position;

a drive arrangement for causing said sliding movement of the first inner section longitudinally of the outer section to the extended position thereof;

and an extension cable and pulley arrangement for causing the movement of the first inner section to the extended position to be communicated to the second inner section to cause said sliding movement of the second inner section longitudinally of the first inner section to the extended position thereof;

the extension cable and pulley arrangement including a first extension pulley and a second extension pulley each mounted on the first inner section and an extension cable arrangement connected at one end to the outer section and at an opposed end to the second inner section so as to pull the second inner section to the extended position as the first inner section moves out of the outer section;

wherein said drive arrangement is arranged also to also cause said sliding movement of the first inner section longitudinally of the outer section to the retracted position thereof, said drive arrangement including a retraction cable and pulley arrangement for causing the movement of the first inner section to the retracted position to be communicated to the second inner section to cause said sliding movement of the second inner section longitudinally of the first inner section to the retracted position thereof;

said retraction cable and pulley arrangement including a first retraction pulley and a second retraction pulley each mounted on the first inner section and a retraction cable arrangement connected at one end to the outer section and at an opposed end to the second inner section so as to pull the second inner section to the retracted position as the first inner section moves into the outer section.

Preferably the first and second pulleys are mounted at the first face of the first inner section with the cable arrangement including first and second cable lengths each wrapped around a respective one of the first and second pulleys and extending along the first face of the second inner section between the first face of the second inner section and the first face of the first inner section.

Preferably the first and second retraction pulleys are mounted at the third face of the first inner section with the retraction cable arrangement including first and second cable lengths each wrapped around a respective one of the first and second retraction pulleys and extending along the third face of the second inner section between the third face of the second inner section and the third face of the first inner section.

While the above definition includes the terms first, second, third and fourth, it is not intended that these be arranged in a particular order around the mast and the use of these terms is for convenience of explanation only. Where the above definition states therefore that first and third faces are used, it is not necessary that these are opposite one another but in many constructions it is preferable that the first and third faces are opposed, that is the components mounted on the first and third faces as defined are arranged on opposed faces of the mast.

Preferably the first and second pulleys are parallel and at right angles to the first face of the first inner section.

Preferably the first and second pulleys are mounted beyond an end of the first inner section.

In a suitable mechanical arrangement, the first and second pulleys can be mounted on a collar attached to an end of the first inner section.

In most constructions for a mast of a suitable height, there is also provided a third inner section inside the second inner section and a second cable and pulley arrangement for causing the movement of the second inner section to the extended position to be communicated to the third inner section to cause said sliding movement of the third inner section longitudinally of the second inner section to the extended position thereof, the second cable and pulley arrangement including a third and a fourth pulley each mounted on the second inner section and a cable arrangement connected at one end to the first inner section and at an opposed end to the third inner section so as to pull the third inner section to the extended position as the second inner section moves out of the first inner section; wherein the third and fourth pulleys are mounted at the third face of the second inner section with the cable arrangement including first and second cable lengths each wrapped around a respective one of the third and fourth pulleys and extending along the third face of the third inner section between the third face of the third inner section and the third face of the second inner section.

In this case, in a preferable symmetrical arrangement there is also provided a second retraction cable and pulley arrangement for causing the movement of the second inner section to the retracted position to be communicated to the third inner section to cause said sliding movement of the third inner section longitudinally of the second inner section to the retracted position thereof, the second retraction cable and pulley arrangement including a third and a fourth retraction pulley each mounted on the second inner section and a retraction cable arrangement connected at one end to the first inner section and at an opposed end to the third inner section so as to pull the third inner section to the retracted position as the second inner section moves into the first inner section; wherein the third and fourth retraction pulleys are mounted at the first face of the second inner section with the retraction cable arrangement including first and second retraction cable lengths each wrapped around a respective one of the third and fourth retraction pulleys and extending along the first face of the third inner section between the first face of the third inner section and the first face of the second inner section.

In a preferred construction, the drive arrangement for causing said sliding movement of the first inner section longitudinally of the outer section to the extended position thereof comprises a drive tube directly connected between a coupling on the outer section and the first inner section so as to directly actuate movement there between.

As set forth above, preferably the first and second pulleys being mounted at the first face of the first inner section with the cable arrangement including first and second cable lengths each wrapped around a respective one of the first and second pulleys and extending along the first face of the second inner section between the first face of the second inner section and the first face of the first inner section.

Preferably the first and second pulleys are parallel and at right angles to the first face of the first inner section. This allows the first and second pulleys to be mounted beyond an end of the first inner section on a collar attached to an end of the first inner section.

Preferably there is a third inner section inside the second inner section and a second cable and pulley arrangement for causing the movement of the second inner section to the extended position to be communicated to the third inner section to cause said sliding movement of the third inner section longitudinally of the second inner section to the extended position thereof, the second cable and pulley arrangement including a third and a fourth pulley each mounted on the second inner section and a cable arrangement connected at one end to the first inner section and at an opposed end to the third inner section so as to pull the third inner section to the extended position as the second inner section moves out of the first inner section; wherein the third and fourth pulleys are mounted at the third face of the second inner section with the cable arrangement including first and second cable lengths each wrapped around a respective one of the third and fourth pulleys and extending along the third face of the third inner section between the third face of the third inner section and the third face of the second inner section. Thus the third and fourth pulleys are mounted on a side of the rectangular mast opposite to the first and second pulleys so that the construction can collapse to a reduce length. Symmetrically the pulleys of further sections or of the outer section can be arranged at alternate sides of the mast to allow better interleaving of the structure when collapsed.

In order to ensure proper retraction of the mast when required, preferably the drive arrangement for causing the sliding movement of the first inner section longitudinally of the outer section to the extended position thereof is arranged also to also cause the sliding movement of the first inner section longitudinally of the outer section to the retracted position thereof, the drive arrangement including a retraction cable and pulley arrangement for causing the movement of the first inner section to the retracted position to be communicated to the second inner section to cause said sliding movement of the second inner section longitudinally of the first inner section to the retracted position thereof; said retraction cable and pulley arrangement including a first retraction pulley and a second retraction pulley each mounted on the first inner section and a retraction cable arrangement connected at one end to the outer section and at an opposed end to the second inner section so as to pull the second inner section to the retracted position as the first inner section moves into the outer section.

That is preferably the system includes a retraction cable and pulley arrangement which is symmetrical to the cable and pulley arrangement which causes erection of the mast.

Preferably the first and second retraction pulleys are mounted at the third face of the first inner section with the retraction cable arrangement including first and second cable lengths each wrapped around a respective one of the first and second retraction pulleys and extending along the third face of the second inner section between the third face of the second inner section and the third face of the first inner section.

Symmetrically as used in the erection system, where there is a third inner section inside the second inner section there is preferably provided a second retraction cable and pulley arrangement for causing the movement of the second inner section to the retracted position to be communicated to the third inner section to cause said sliding movement of the third inner section longitudinally of the second inner section to the retracted position thereof, the second retraction cable and pulley arrangement including a third and a fourth retraction pulley each mounted on the second inner section and a retraction cable arrangement connected at one end to the first inner section and at an opposed end to the third inner section so as to pull the third inner section to the retracted position as the second inner section moves into the first inner section; wherein the third and fourth retraction pulleys are mounted at the first face of the second inner section with the retraction cable arrangement including first and second retraction cable lengths each wrapped around a respective one of the third and fourth retraction pulleys and extending along the first face of the third inner section between the first face of the third inner section and the first face of the second inner section.

Preferably the first and second cable lengths are mounted at the bottom of the second inner section by a mounting member which allows transfer of loads between the first and second cable lengths.

Preferably the mounting member which allows transfer of loads between the first and second cable lengths comprises an arcuate disk member or part of a disk member carried on the first face of the second inner section for pivotal movement about an axis thereof at right angles to the first face with the cable lengths wrapped wound an outer periphery of the arcuate disk member.

Preferably the arcuate disk member is arranged to trap the cable lengths to prevent escape therefrom. Thus the cable is contained in the area between the inner and outer faces of the tubular sections to resist the cable becoming released from its track.

In one arrangement the drive arrangement for causing said sliding movement of the first inner section longitudinally of the outer section to the extended position thereof comprises a drive tube.

However more preferably the drive arrangement for causing said sliding movement of the first inner section longitudinally of the outer section to the extended position thereof comprises a further cable and pulley arrangement symmetrical to that which elevates the second inner section including a first further pulley and a second further pulley each mounted on the outer section and a further cable arrangement connected at one end to a winch and at an opposed end to the first inner section so as to pull the first inner section to the extended position. In this arrangement preferably the further cable arrangement comprises first and second further cable lengths which are mounted at the bottom of the first inner section by a mounting member which allows transfer of loads between the first and second further cable lengths and wherein the winch is arranged to simultaneously and symmetrically pull the first and second further cable lengths.

Preferably the elongate member is a strap. However other shapes of the elongate member can be used including potentially a cable.

Preferably the elongate member in the form of a flat solid strap of metal has a width substantially equal to a transverse interior width of the tube.

Preferably the elongate member is stainless steel which has the ability to bend with predetermined characteristics without the risk of fracture. In this way the tube can be designed to fracture under the load and therefore the boom collapses inwardly toward the mast so that the distance of the coupling to which the harness is attached from the mast reduces to reduce the side load on the mast caused by the fall. In this way total loading on the mast can be reduced so that the dimensions of the mast and the support for the mast can be reduced.

Preferably the tube is of rectangular cross-section and the elongate member in the form of the flat strap is located in the tube at a bottom wall of the tube.

It is of course necessary that the elongate member in the form of the strap remains connected to the mast at the inner end and to the coupling at the outer end to maintain continuity when the tube fractures. Thus preferably the tube is fastened to the support member by a pin passing through transverse holes in the tube and wherein the elongate member includes a hole therethrough by which the elongate member is connected to the pin. In order to maintain this continuity, as additional wire cable may be attached along the tube on the exterior or on the interior so that in effect the cable from the harness to the coupling is continued right up to the mast by the additional cable. There is therefore no danger of the harness being disconnected from the mast on the shock loading from a fall even though the worker will fall an additional distance defined by the length of the boom as he boom collapses.

The term fracture used in relation to the tube is not limited to an arrangement in which the tube breaks at a specific location across its length but instead is intended to include any breaking of the tube at any location which occurs due to the load applied in the downward direction by the load and due to the bending of the elongate member or strap.

Preferably therefore in one example, the tube is of rectangular cross-section with a top wall, two side walls and a bottom wall with the elongate member located in the tube at or adjacent the bottom wall, and preferably the side walls of the tube are arranged adjacent an outer end of the tube so as to commence and propagate a tearing action of the bottom wall from the side walls or at least part of the side walls as the elongate member or strap bends.

Preferably the tearing action is controlled by and started by the provision of slots in each of the side walls to propagate the tearing action.

Preferably the slot in the side walls is spaced from the end of the tube so that the tearing action commences only at a predetermined load.

Preferably the support member includes an elongate mounting member inserted into a top end of the mast.

Preferably the elongate mounting member carries a plurality of upstanding receptacles at spaced positions therearound each for receiving a respective insert member of a respective one of the plurality of booms.

Preferably each boom includes a swivel coupling for limited side to side pivotal movement of the boom relative to the elongate mounting member about an axis parallel to an upstanding axis of the mast so that this side to side movement is combined with the free rotation of the insert member into the upper end of the mast.

Preferably the top support member is removable.

Preferably there is provided a first bracket member attaching the outer section of the mast to the support base for pivotal movement about a horizontal axis transverse to the mast and an actuator attached to the support base for moving the mast between a horizontal stored position across the support base to an erected position standing upwardly from the support base.

Preferably the support base comprises a rectangular body filled with a ballast material and wherein the first bracket member is mounted on one upstanding side wall of the body.

BRIEF DESCRIPTION OF THE DRAWINGS

One embodiment of the invention will now be described in conjunction with the accompanying drawings in which:

FIG. 8 is a top plan view of the top of the mast of FIG. 1 showing two of the booms.

FIG. 9 is an isometric view of the components of FIG. 8.

In the drawings like characters of reference indicate corresponding parts in the different figures.

DETAILED DESCRIPTION

Figure 1:
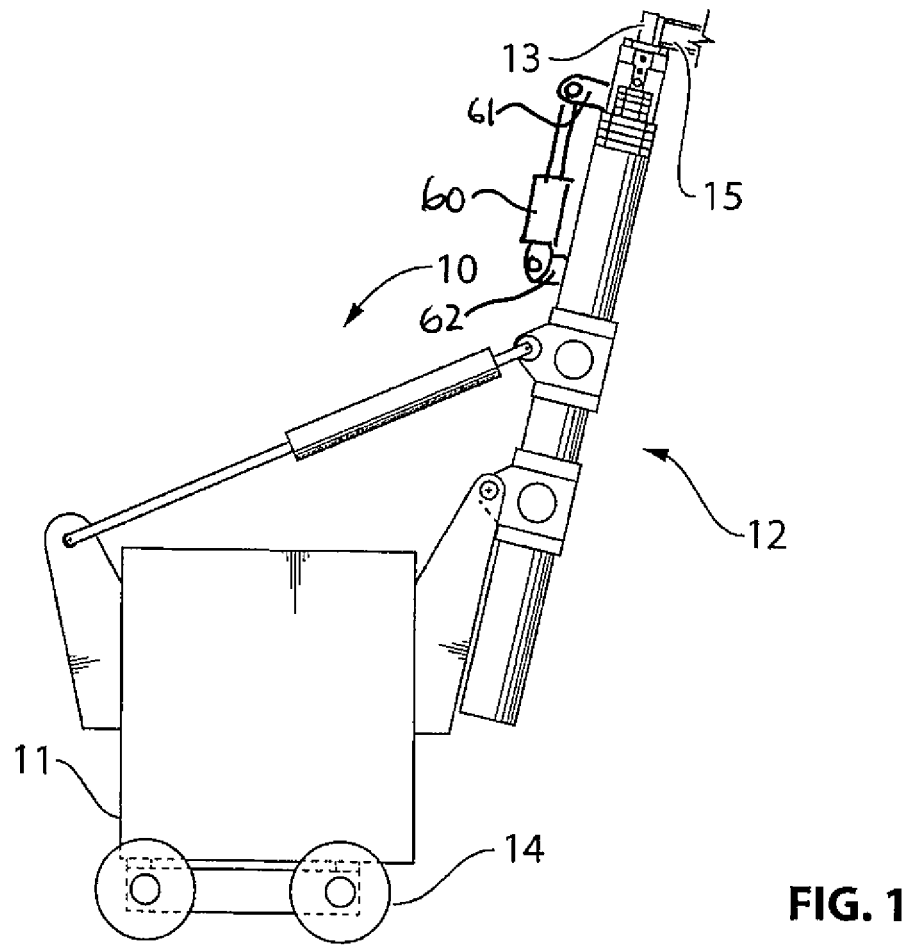
FIG. 1 is a side elevational view of a fall restraint apparatus according to the present invention showing a mast mounted on a support base in the erected position of the mast.

A fall restraint apparatus 10 comprises a support base 11, a mast 12, and a top support member 13 mounted on a top of the mast. The support base is preferably of the construction shown in U.S. Pat. No. 8,931,749 issued Jan. 13, 2015 of the present Applicant, the disclosure of which is incorporated herein by reference. In this case the base 11 may be mounted on a wheeled support or vehicle for movement to a required location, the wheeled support 14 being shown only schematically.

Figure 10:
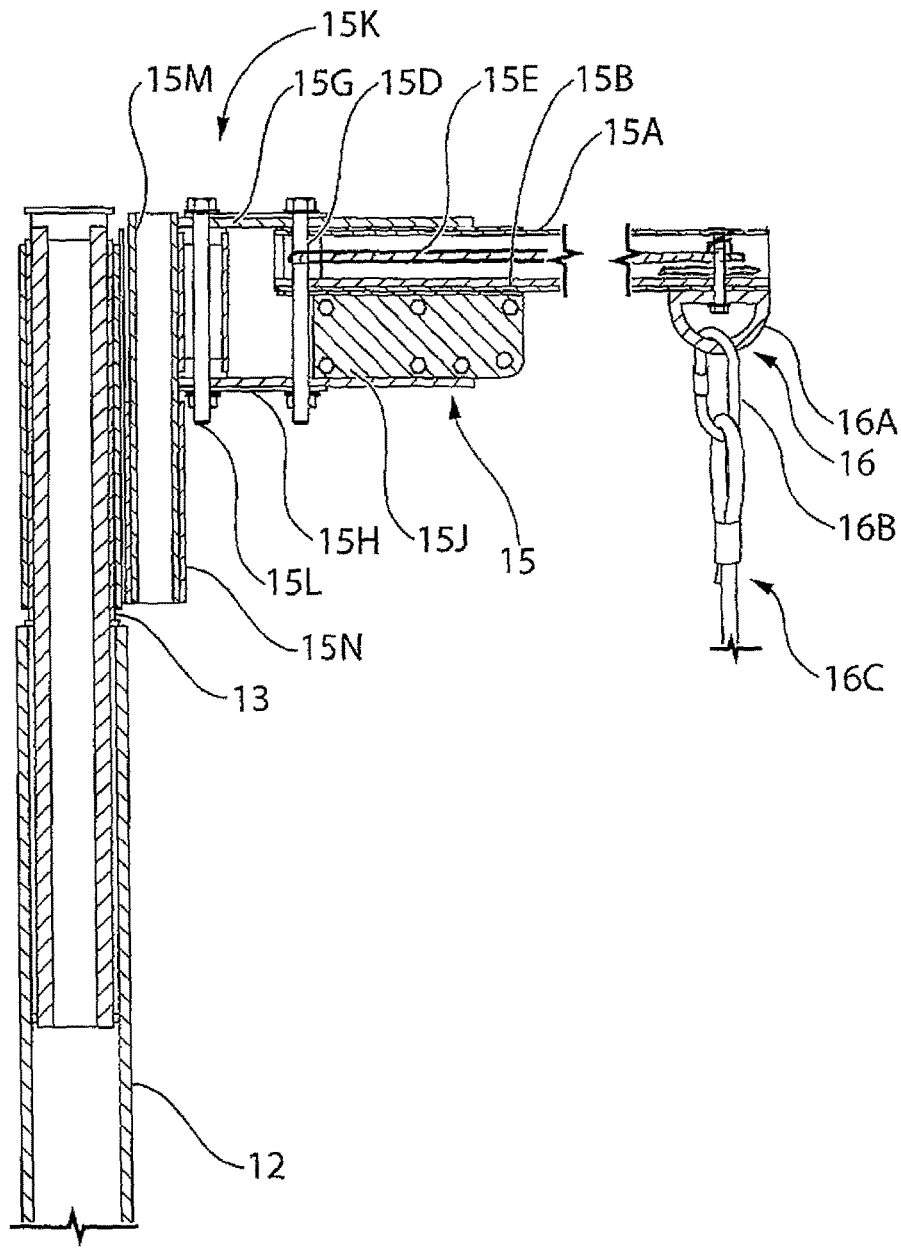
FIG. 10 is a cross-sectional view along the lines 9-9 of FIG. 8.
Figure 11:
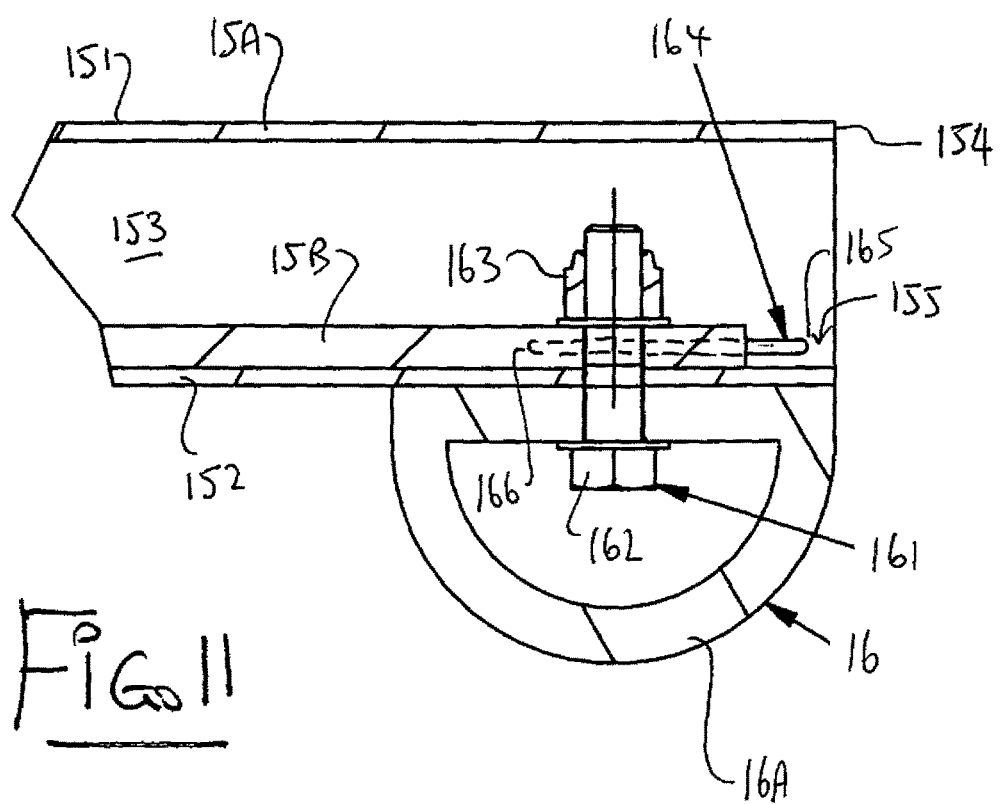
FIG. 11 is a view similar to that of FIG. 10 showing an end portion of the boom only and including slots for creating and propagating a tearing action in the tube.

The support member 13 includes at least one and more typically two or four booms 15 attached to the support member 13 and extending outwardly to one side of the mast;

As shown in FIG. 10 or 11, each boom 15 includes a coupling member 16 in the form of a loop 16A attached to the boom at the outer end of the boom for receiving a fall restraint harness 16C of a worker attached by a cable 16B to the loop 16A.

Figure 2:
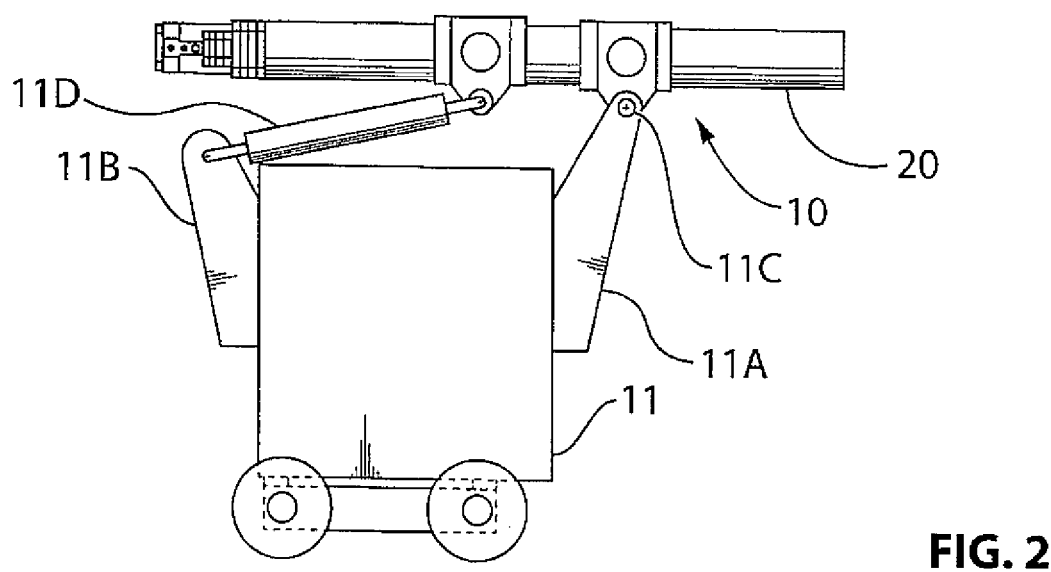
FIG. 2 is a side elevational view of the fall restraint apparatus of FIG. 1 showing the mast in the folded position of the mast.

The mast 12 is telescopic so as to extend from the collapsed position shown in FIG. 2 to the erected position shown in FIG. 1. The telescopic mast includes, as best shown in FIGS. 3 to 6, a plurality of tubular mast sections including an outer section 20, and a plurality of inner sections 21, 22 and 23. The number of inner sections can be varied to provide a required height of the mast. In the schematic illustration as shown as an example in FIGS. 5 and 6 there is provided only a first inner section 21 slidable longitudinally within the outer section 20 and a second inner section 22 slidable longitudinally within the first inner section 21. It will be appreciated that additional symmetrically mounted further sections can be provided including the third inner section 23 of FIG. 4. Each section has slide collars 24 at the ends so as to provide a bearing surface relative to the surrounding section.

Each of the sections has a rectangular cross-section so that each has first, second, third and fourth faces 21A, 21B, 21C and 21D parallel to and immediately adjacent respective first, second, third and fourth faces of each of the other sections. In this way the sections are slidable from a retracted position where the first and second inner sections are at least partly within the outer section to an extended position.

A drive arrangement 30 is provided for causing the sliding movement of the first inner section 21 longitudinally of the outer section 20 to the extended position thereof, and a cable and pulley arrangement 40 is provided for causing the movement of the first inner section 21 to the extended position to be communicated to the second inner section 22 to cause said sliding movement of the second inner section longitudinally of the first inner section to the extended position thereof. Symmetrically a second cable and pulley arrangement 50 is provided for causing the movement of the second inner section 22 to the extended position to be communicated to the third inner section 23 to cause the sliding movement of the third inner section 23 longitudinally of the second inner section 22 to the extended position thereof. The drive arrangements provided by the drive 30, the first arrangement 40 and the second arrangement 50 are separate and independent of one another and are symmetrical.

Thus the cable and pulley arrangement 30 includes a first and a second pulley 31, 32 each mounted on the outer section 20 and a cable arrangement 33 connected at one end 33A to the outer section 20 and at an opposed end to the first inner section 21 so as to pull the first inner section 21 to the extended position. The end 33A of the cable arrangement is connected to a winch 33C and so as to pull the first inner section to the extended position. The cable lengths 33 are mounted at the bottom of the first inner section 20 by a mounting member 33D which allows transfer of loads between the first and second further cable lengths. The member 33D comprises an arcuate disk member 33E carried on the first face 21A of the first inner section for pivotal movement about an axis 33F thereof at right angles to the first face with the cable lengths 33 wrapped wound an outer periphery of the arcuate disk member. Thus unbalanced loads on the cable can be taken up by slight rotation of the disk 33E to prevent excess loading on one part of the cable which could cause breakage. Both cable lengths therefore contribute equally so that the diameter of the cable can be chosen bearing in mind that only half of the load is applied to each so that the cable can be received in the relatively narrow space between the faces 20A and 21A.

Figure 5:
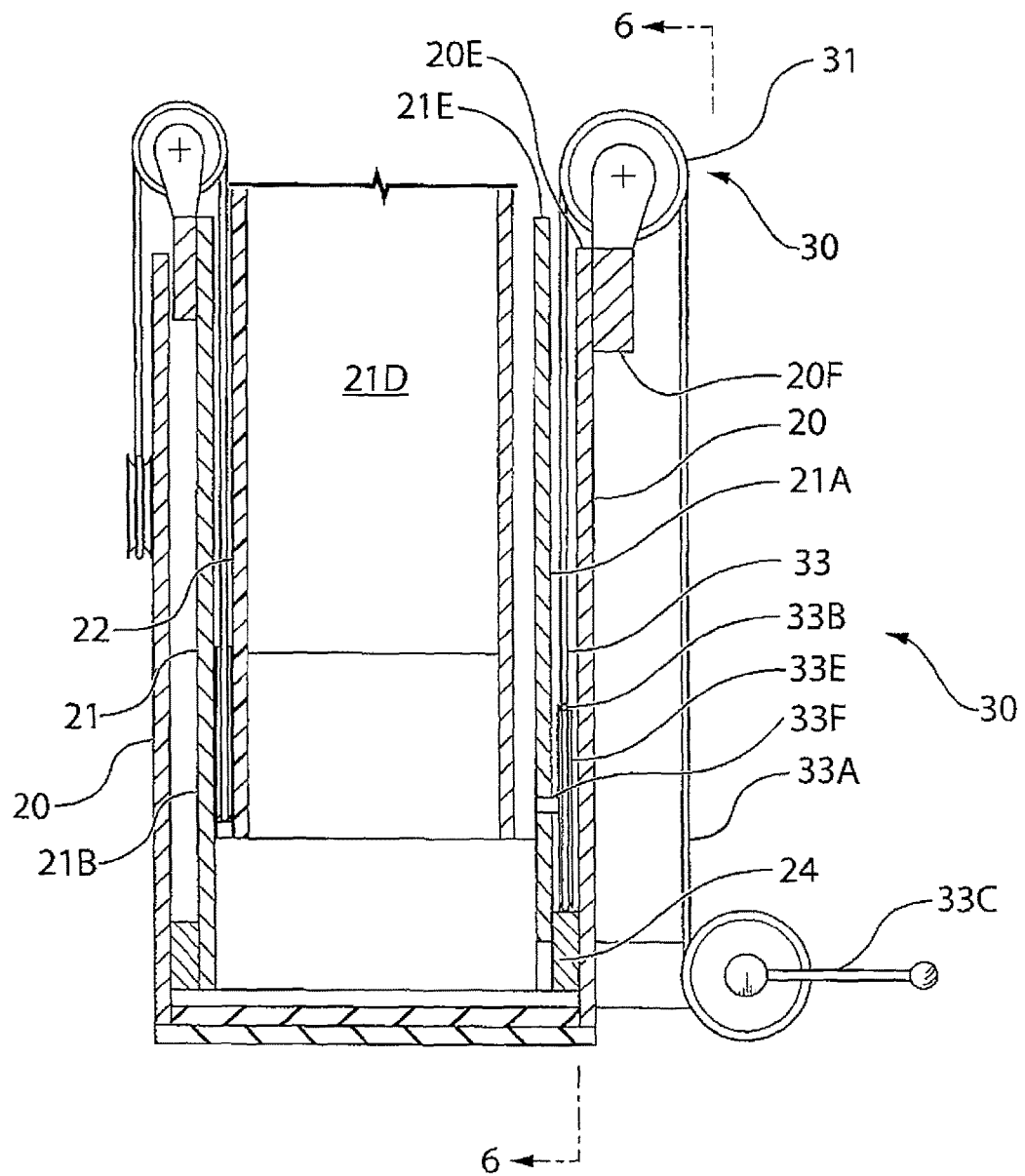
FIG. 5 is a schematic cross-sectional view similar to that of FIG. 4 with the transverse dimensions enlarged to show the construction more clearly.
Figure 6:
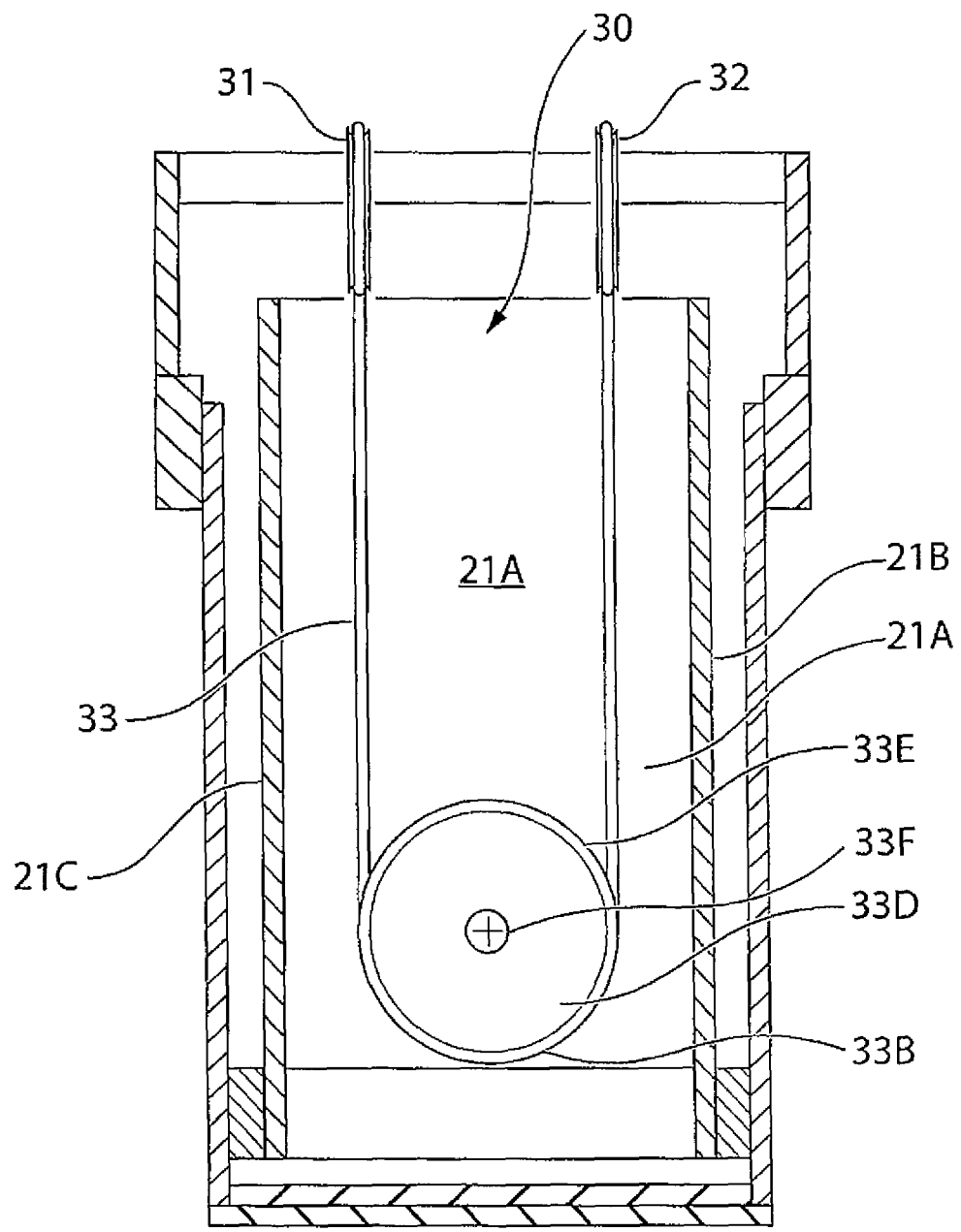
FIG. 6 is a cross-sectional view along the lines 6-6 of FIG. 5.

Also the arcuate disk member 33E is arranged to trap the cable lengths 33 to prevent escape therefrom by locating the cable in a peripheral channel and by butting that channel up against the bearing block 24 as shown in FIG. 5. Thus the cable is contained in the area between the inner and outer faces of the tubular sections to resist the cable becoming released from its track.

The winch 36C is arranged to simultaneously and symmetrically pull the first and second further cable lengths 33 so that the load from the winch acting to extend the mast is applied to both cable lengths.

The first and second pulleys 31 and 32 are mounted at the first face 20A of the outer section with the cable arrangement 33 including first and second cable lengths each wrapped around a respective one of the first and second pulleys and extending along the first face of the first inner section between the first face of the first inner section and the first face of the outer section.

The first and second pulleys 31, 32 are parallel and at right angles to the first face 21A of the first inner section 21. This allows the first and second pulleys to be mounted beyond an end 20E of the outer section 20 on a collar 20F attached to an end of the outer section.

As described above the mast is formed by a series of effectively symmetrical stages 30, 40 and 50 where the first stage comprises pulleys 31, 32 and cable 33. Symmetrically stage 40 comprises pulleys 41 and 42 and a cable 43 and stage 50 comprises pulleys 51, 52 and cable 53.

Thus there is a third inner section 23 inside the second inner section 22 and a second cable and pulley arrangement 50 for causing the movement of the second inner section 22 to the extended position to be communicated to the third inner section 23 to cause said sliding movement of the third inner section 23 longitudinally of the second inner section 22 to the extended position thereof, the second cable and pulley arrangement 50 including a third and a fourth pulley 51, 52 each mounted on the second inner section 22 and a cable arrangement connected at one end to the first inner section and at an opposed end to the third inner section 23 so as to pull the third inner section 2 to the extended position as the second inner section moves out of the first inner section.

The third and fourth pulleys 41, 42 are mounted at the third face 22C of the second inner section 22. Thus the third and fourth pulleys 41, 42 are mounted on a side of the mast opposite to the first and second pulleys and on an opposite side to the pulleys 51 and 52 so that the construction can collapse to a reduce length since the pulleys do not sit one on top of the next. Symmetrically the pulleys of further sections or of the outer section can be arranged at alternate sides of the mast to allow better interleaving of the structure when collapsed. Also as the transverse dimension of the sections reduces, the pulleys are closer together so that again there is more room to bring the height down in the collapsed condition.

In one arrangement the drive arrangement for causing the sliding movement of the first inner section longitudinally of the outer section comprises a drive tube 60 connected between a lug 62 to the outer tube and a lug 61 connected to the first inner tube.

The apparatus further includes, as part of the drive arrangement including the tube 60, directly symmetrical components for driving the mast in the downward direction to the retracted position.

Thus the first inner tube is driven downwardly into the outer tube by the drive tube 60 commencing the retraction of the mast. In some cases the mast is sufficiently loaded at the top section so that it will necessarily retract with each section pulling into the next section simply by the force of gravity. However when the load is insufficient all in order to ensure safety to provide controlled retraction of the sections of the mast, there is provided a pair of cable and pulley arrangements as previously described but operating in opposite directions for retraction.

Figure 7:
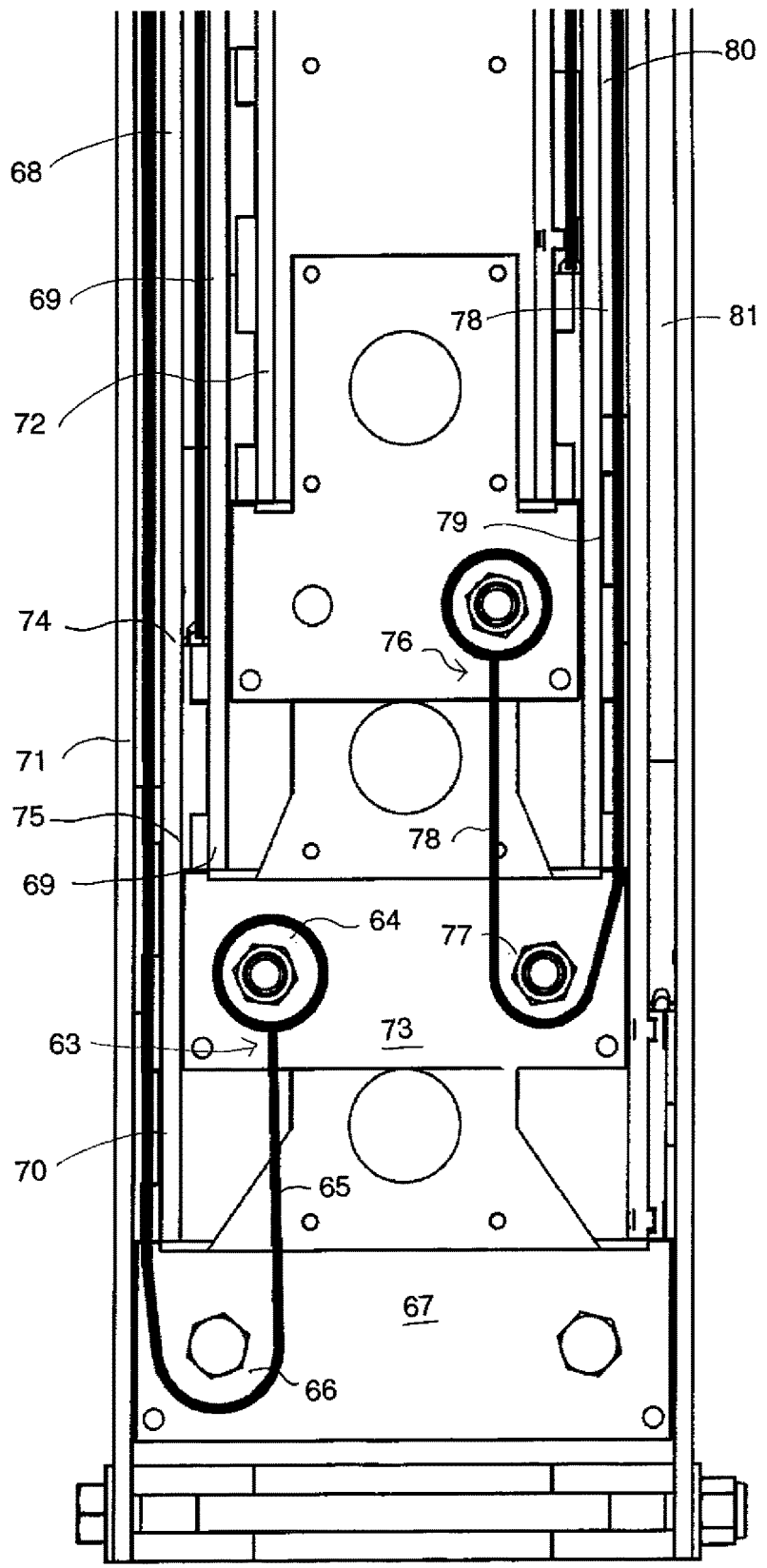
FIG. 7 is a cross-sectional view similar to that of FIG. 4 showing also the retraction system symmetrical to the erection system shown in the above Figures.

In FIG. 7 there is shown the lower end of the mast in the retracted position including the outer section or tube 71, a first inner tube 70, a second inner tube 69 and the third inner tube 72, all as previously described.

Thus as shown in FIG. 7 there is a first cable and pulley arrangement generally indicated at 63 including a cable 65 fastened to the second inner tube 69 at a clamp 64 on a bracket 73 attached to the second inner tube and wrapped around a pulley 66 carried on a bracket 67 at the bottom end of the first inner tube 70. The cable 65 extends through a space 74 between the outside surface of the first inner tube and an inside surface of the outer tube 71 up to a disk member 68 on the outside surface of the first inner tube 70. The disk member 68 is identical to the disk member 33E and operates in a symmetrical manner.

In this way when the first inner tube 70 is it driven downwardly by the drive tube 60, its movement is communicated by a downward movement of the pulley 66 which pulls the portion of the cable 65 connected to the clamp 64 so as to pull the second in the tube 69 downwardly. In view of the symmetry between the cable and pulley arrangement 63 and that the previously described cable and pulley arrangements for the erection movement, it will be appreciated that the pulley 66 formed one of a pair of pulleys attached to the bracket 67 and that the cable 65 passes around the disk member 68 the form two parallel runs of the cable.

Thus the drive arrangement includes a retraction cable and pulley arrangement 63 for causing the movement of the first inner section 70 to the retracted position to be communicated to the second inner section 69 to cause the sliding movement of the second inner section 69 longitudinally of the first inner section 70 to the retracted position thereof. The retraction cable and pulley arrangement 63 includes the first retraction pulley and a second retraction pulley 66 each mounted on the first inner section 70 and a retraction cable arrangement 65 connected at one end to the first inner section and at an opposed end to the second inner section so as to pull the second inner section 69 to the retracted position as the first inner section 70 moves into the outer section 71.

The first and second retraction pulleys 66 are mounted at the third face 75 of the first inner section with the first and second cable lengths 65 each wrapped around a respective one of the first and second retraction pulleys 66 and extending along the third face 75 of the first inner section between the third face of the first inner section and the third face of the outer section.

In order to provide retraction movement of the third inner section to the fully retracted position with the movement of the second inner section obtained above, there is provided a second retraction cable and pulley arrangement 76 symmetrical to the previously described arrangements for causing the movement of the second inner section 69 to the retracted position to be communicated to the third inner section 72 to cause the sliding movement of the third inner section 72 longitudinally of the second inner section 69 to the retracted position thereof. The second retraction cable and pulley arrangement 76 a third and a fourth retraction pulley 77 each mounted on the second inner section 69 of the bracket 73 and a retraction cable arrangement 78 connected at one end to the second inner section and at an opposed end to the third inner section so as to pull the third inner section to the retracted position as the second inner section moves into the first inner section. In symmetrical manner the third and fourth retraction pulleys 77 are mounted at the first face 79 of the second inner section with the retraction cable arrangement including first and second retraction cable lengths 78 each wrapped around a respective one of the third and fourth retraction pulleys 77 and extending along the first face of the third inner section between the first face of the third inner section and the first face of the second inner section up to the disk member 80.

In this arrangement the first face of the sections is opposite to the third face of the sections. As previously described, the cable which causes the erection is located in the space indicated at 81 between the outer tube and that the first inner tube which is on the first side face of the structure. The cable which causes the retraction is located in the space 74 between the outer tube and the first inner tube but at the third side. In this way the erection and retraction cables are all located on the first and third opposing sides.

Turning now to FIGS. 9, 10 and 11, the boom 15 includes an outer tube 15A attached to the support member 13 at an inner end and attached to the coupling member 16 at an outer end. The tube is formed of aluminum or similar material so that it provides structural strength to stand out to the side of the mast but is arranged so that it fractures on application of a load applied by a fall to the coupling member causing bending of the tube.

In order to provide structural integrity and continued connection from the mast to the coupling 16 in the event of a fall causing fracturing of the tube as it bends beyond an allowable angle, there is also provide an internal elongate member in the form of a flat strap 15B located inside the tube and attached to the support member at the inner end and attached to the coupling member at the outer end. The flat strap 15B is formed of a flexible metal such as stainless steel which is arranged so that it bends without fracturing on fracture of the tube. The elongate member in the form of a flat solid strap of metal has a width substantially equal to a transverse interior width of the tube. Stainless steel which has the ability to bend with predetermined characteristics without the risk of fracture. In this way the tube can be designed to fracture under the load and therefore the boom collapses inwardly toward the mast so that the distance of the coupling to which the harness is attached from the mast reduces to reduce the side load on the mast caused by the fall. In this way total loading on the mast can be reduced so that the dimensions of the mast and the support for the mast can be reduced.

The tube 15A is of rectangular cross-section and the flat strap 15B is located in the tube at a bottom wall of the tube.

It is of course necessary that the elongate member in the form of the strap remains connected to the mast at the inner end and to the coupling at the outer end to maintain continuity when the tube fractures. Thus the tube and strap are simultaneously fastened to the support member by a pin 15D passing through transverse holes in the tube and the strap. In order to maintain this continuity, an additional wire cable 15E may optionally be attached along the tube on the exterior or on the interior so that in effect the cable from the harness to the coupling is continued right up to the mast by the additional cable 15E. There is therefore no danger of the harness being disconnected from the mast on the shock loading from a fall even though the worker will fall an additional distance defined by the length of the boom as the boom collapses.

The pin 15D is carried on a top and bottom plate 15G, 15H strengthened by a gusset 15J between the tube and the bottom plate 15H. The plates 15G and 15H connect to a swivel coupling 15K which allows the boom to swivel in a horizontal plane but an axis parallel to the mast through a limited angle of the order of 70 degrees. The swivel coupling 15K is attached to a vertical tube 15M carried in a sleeve 15N. The sleeve 15N is attached on one side of the support member 13. Thus the support member 13 is removable as a whole from the top of the mast by sliding out of the top section. Also the support member provides a number, typically two or four of the sleeves 15N for receiving the pin 15M of the selected number of booms.

As best shown in FIGS. 10 and 11, the tube 15A is rectangular with a top wall 151, a bottom wall 152 and sidewalls 153. The tube extends to an open end 154. The coupling loop 16A of the attachment 16 is coupled by a pin 161 which has ahead 162 and extends through the bottom wall 152 of the tube and through the strap 15B to a nut 163 bus connecting the coupling ring to the bottom wall 152 and the strap 15B.

On application of a load to the ring 16A from a fall of a user, the load is applied to the pin 161 into the tube and into the strap 15B. The side walls 153 are arranged by provision of a slot 154 adjacent an outer end of the tube so as to commence and propagate a tearing action of the bottom wall 152 from the side walls 153 as the elongate member 15B bends. That is the downward load on the coupling 16 tends to bend the strap 15B downwardly which is free to bend. However the tube 15A cannot bend with the strap but will instead fracture at a controlled location. In one arrangement this can occur simply as a transverse fracture of the tube for example of the inner end of the tube where it joins the outer support tube. However more preferably the provision of the slots 164 causes a tearing action to commence at the length of the slot so as to continue along the direction of the slot to separate the bottom wall 152 from the sidewalls 153. This tearing action continues to a distance depending upon the load applied. This tearing action tends to control the bending of the strap so that instead of bending at one location at which the tube fractures, instead the tearing action gradually causes the bend to move along the strap 15B from the end 154 of the tube along the tube to the location where the tearing action terminates. It will be appreciated that this downward movement caused by the bending of the strap moves that the coupling 16 downwardly and toward the mast so as to reduce the mechanical advantage applied by the load to the mast. In this way the forces on the mast as significantly reduced both by the shock absorbing effect of the bending of the strap and the by the movement of the point of load from the end 154 of the tube toward the mast.

The slot 164 in the side walls has ends 165 and 166 spaced along the length of the tube by a relatively short distance relative to the full length of the tube. Both the structure of the tube is not significantly compromised during normal support of the coupling 16. The end 165 is spaced from the end 154 of the tube so that the tearing action to leave an intact portion 155 of the tube between the end 165 on the end 154 so that the intact portion maintains the structure of the tube up to a predetermined load whereupon the tearing action commences only at the predetermined load. The slot 164 is located close to the adjacent the bottom wall 152 at or adjacent the strap 15B so that only the bottom wall 152 is torn away from the remainder of the tube.

Figure 3:
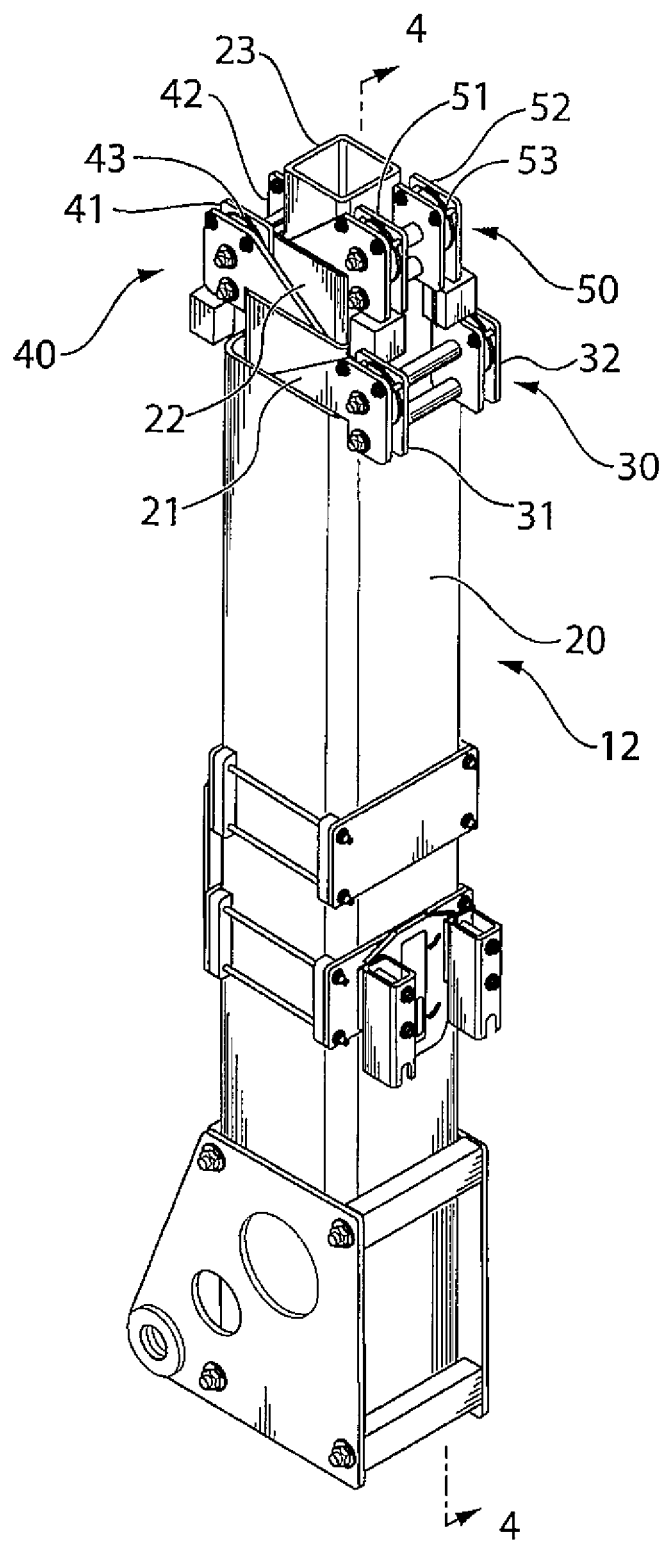
FIG. 3 is an isometric view of the mast of FIG. 1.
Figure 4:
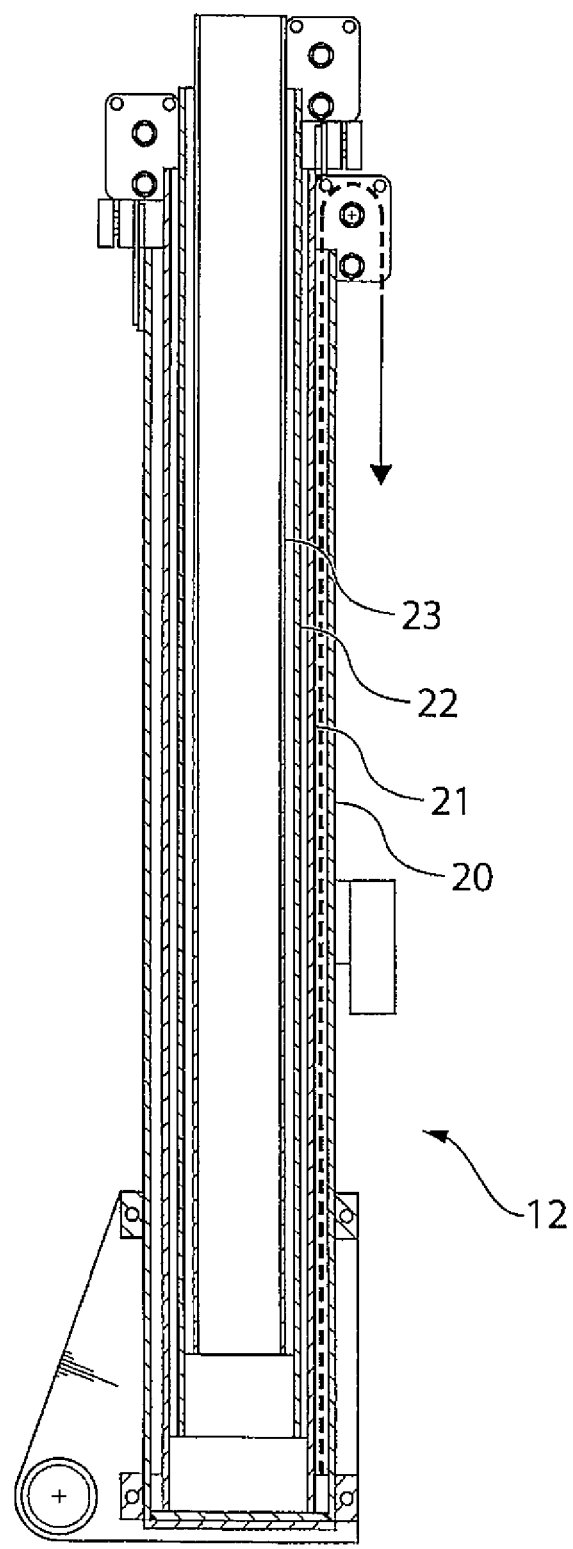
FIG. 4 is a cross-sectional view along the lines 4-4 of FIG. 3 of the mast of FIG. 1.

Turning again to FIG. 1, there is provided a first bracket member 11A attaching the outer section 20 of the mast to the support base 11 for pivotal movement about a horizontal axis at pivot pin 11C transverse to the mast and an actuator 11D attached to the support base at a bracket 11B on the opposite side of the base 11 for moving the mast between a horizontal stored position shown in FIG. 2 across the support base to an erected position shown in FIG. 3 standing upwardly from the support base.

The support base comprises a rectangular body filled with a ballast material and comprising an outer metal wall connected to the brackets for transferring the loads from the mast into the support base. The fact that the boom is collapsible reduces the side loading on the mast so that the support base can hold the mast vertical without toppling and without breakage of any of the coupling components.

The invention claimed is:

1. A method for absorbing a shock force caused by a fall of an object comprising:
    attaching the object to a coupling member of a boom at an outer end of the boom so that the fall of the object applies the shock force to the boom in a direction transverse to the boom;
    attaching the boom to a mounting on a support member so that the boom extends outwardly from the support member from an inner end of the boom to an outer end of the boom;
    the boom being cantilevered by the mounting from the support member so as to support the coupling member at a predetermined distance from the support member and such that the shock force on the boom acts to apply a bending force to the boom relative to the mounting in the direction transverse to the boom;
    the boom comprising first and second elongate members each attached to the mounting on the support member at the inner end of the boom and attached to the coupling member at the outer end of the boom;
    the first and second elongate members supporting the bending force substantially without bending up to a predetermined maximum value;
    the shock force of the fall of the object being arranged to exceed the maximum value which causes the first elongate member to fracture so as to no longer support the bending force;
    the shock force of the fall of the object causing the second elongate member to bend without fracturing on fracture of the first elongate member;
    the second elongate member, when the first elongate member is fractured, connecting the coupling member to the mounting on the support member so as hold the coupling member and the object attached thereto from disconnection from the support member and supporting the coupling member from the support member;
    the first and second elongate members by the fracture of the first elongate member and the bending of the second elongate member causing the distance of the coupling member from the support member to be reduced from said predetermined distance.

2. The method according to claim 1 wherein the first and second elongate members lie immediately adjacent with the first elongate member at least partly surrounding the second elongate member.

3. The method according to claim 2 wherein the first elongate member is a tube and the second elongate member is located inside the tube.

4. The method according to claim 2 wherein the second elongate member comprises a strap having a width substantially equal to a transverse interior width of the first elongate member.

5. The method according to claim 2 wherein the first elongate member comprises a bottom wall and two side walls substantially at right angles thereto and wherein the second elongate member is located at the bottom wall.

6. The method according to claim 1 wherein the second elongate member comprises a cable.

7. The method according to claim 1 wherein the first elongate member is arranged to fracture by bending at a position part way between the support member and the coupling member.

8. The method according to claim 1 wherein there is provided:
    a base for mounting at or adjacent the ground;
    a mast mounted on the base so as to stand upwardly;
    said support member being mounted at a top of the mast;
    said boom attached to the support member extending outwardly to one side of the mast;
    said coupling member receiving a fall restraint harness of a worker.

9. The method according to claim 8 wherein the support member comprises an elongate mounting member inserted into a top end of the mast and a plurality of upstanding receptacles at spaced positions around the mast each for receiving a respective insert member of a respective one of a plurality of booms.

10. The method according to claim 8 wherein there is provided a plurality of booms at angularly spaced positions around the mast and wherein each boom includes a swivel coupling for limited side to side pivotal movement of the boom relative to the elongate mounting member about an axis parallel to an upstanding axis of the mast.

11. The method according to claim 8 wherein the base comprises a rectangular body at least partly filled with a ballast material and comprises first and second opposed upstanding metal walls, wherein a first bracket member is mounted on the first upstanding metal wall attaching the outer section of the mast to the support base for pivotal movement about a horizontal axis transverse to the mast, wherein there is provided an actuator attached to the support base for moving the mast between a horizontal stored position across a top of the support base to an erected position standing upwardly from the support base and wherein there is provided a second bracket member mounted on the second upstanding metal wall attaching the actuator to the support base.

12. A method for absorbing a shock force caused by a fall of an object comprising:
   attaching the object to a coupling member of a boom at an outer end of the boom so that the fall of the object applies the shock force to the boom in a direction transverse to the boom;
   attaching the boom to a mounting on a support member so that the boom extends outwardly from the support member from an inner end of the boom to an outer end of the boom;
   the boom being cantilevered by the mounting from the support member so as to support the coupling member at a predetermined distance from the support member and such that the shock force on the boom acts to apply a bending force to the boom relative to the mounting in the direction transverse to the boom;
   the boom comprising first and second elongate members each attached to the mounting on the support member at the inner end of the boom and attached to the coupling member at the outer end of the boom;
   the first and second elongate members supporting the bending force substantially without bending up to a predetermined maximum value;
   wherein the first elongate member comprises at least one wall;
   wherein the first elongate member includes a weakening element in said at least one wall to commence a tearing action;
   the shock force of the fall of the object being arranged to exceed the maximum value which causes the first elongate member to fracture by a tearing action of said at least one wall of the first elongate member commencing at the weakening element adjacent the coupling member and extending toward the support member;
   the shock force of the fall of the object causing the second elongate member to bend without fracturing on fracture of the first elongate member;
   the second elongate member, when the first elongate member is fractured, connecting the coupling member to the mounting on the support member so as hold the coupling member and the object attached thereto from disconnection from the support member and supporting the coupling member at a spaced distance away from the support member;
   the first and second elongate members by the fracture of the first elongate member and the bending of the second elongate member causing the distance of the coupling member from the support member to be reduced from said predetermined distance to said spaced distance.

13. The method according to claim 12 wherein the first elongate member comprises a tube of rectangular cross-section with a top wall, two side walls and a bottom wall and wherein the side walls include said at least one weakening element therein arranged adjacent the coupling member so that said bending of the first elongate member commences and propagates a tearing action of the bottom wall from the two side walls.

14. The method according to claim 13 wherein the second elongate member is located in the first elongate member at or adjacent the bottom wall.

15. The method according to claim 14 wherein the second elongate member is a strap.

16. The method according to claim 15 wherein the second elongate member has a width substantially equal to a transverse interior width of the tube.

17. The method according to claim 13 wherein the said at least one perforation in the side walls is spaced from the end of the tube to leave an intact portion at the end of each side wall.

18. The method according to claim 12 wherein the first and second elongate members lie immediately adjacent with the first elongate member at least partly surrounding the second elongate member.

19. The method according to claim 18 wherein the first elongate member is a tube and the second elongate member is located inside the tube.

20. The method according to claim 18 wherein the second elongate member comprises a strap having a width substantially equal to a transverse interior width of the first elongate member.

21. The method according to claim 18 wherein the first elongate member comprises a bottom wall and two side walls substantially at right angles thereto and wherein the second elongate member is located at the bottom wall.

22. The method according to claim 12 wherein the second elongate member comprises a cable.

23. The method according to claim 12 wherein there is provided:
   a base for mounting at or adjacent the ground;
   a mast mounted on the base so as to stand upwardly;
   said support member being mounted at a top of the mast;
   said boom attached to the support member extending outwardly to one side of the mast;
   said coupling member receiving a fall restraint harness of a worker so that shock load from a fall is applied to the coupling member.

24. The method according to claim 23 wherein the support member comprises an elongate mounting member inserted into a top end of the mast and a plurality of upstanding receptacles at spaced positions around the mast each for receiving a respective insert member of a respective one of a plurality of booms.

25. The method according to claim 23 wherein there is provided a plurality of booms at angularly spaced positions around the mast and wherein each boom includes a swivel coupling for limited side to side pivotal movement of the boom relative to the elongate mounting member about an axis parallel to an upstanding axis of the mast.

26. The method according to claim 23 wherein the base comprises a rectangular body at least partly filled with a ballast material and comprises first and second opposed upstanding metal walls, wherein a first bracket member is mounted on the first upstanding metal wall attaching the outer section of the mast to the support base for pivotal movement about a horizontal axis transverse to the mast, wherein there is provided an actuator attached to the support base for moving the mast between a horizontal stored position across a top of the support base to an erected position standing upwardly from the support base and wherein there is provided a second bracket member mounted on the second upstanding metal wall attaching the actuator to the support base.

\* \* \* \* \*